(12) United States Patent
Pardue

(10) Patent No.: US 8,594,182 B1
(45) Date of Patent: Nov. 26, 2013

(54) SYSTEMS AND METHODS FOR VIDEO RATE CONTROL

(75) Inventor: William David Pardue, Dawsonville, GA (US)

(73) Assignee: Verint Systems, Inc., Santa Clara, CA (US)

( * ) Notice: Subject to any disclaimer, the term of this patent is extended or adjusted under 35 U.S.C. 154(b) by 862 days.

(21) Appl. No.: 12/782,542

(22) Filed: May 18, 2010

Related U.S. Application Data

(60) Provisional application No. 61/179,260, filed on May 18, 2009.

(51) Int. Cl.
*H04N 7/12* (2006.01)
(52) U.S. Cl.
USPC .................................. 375/240.01
(58) Field of Classification Search
USPC .................................. 375/240.01
See application file for complete search history.

(56) References Cited

U.S. PATENT DOCUMENTS

| | | | | |
|---|---|---|---|---|
| 5,875,305 | A * | 2/1999 | Winter et al. | 709/231 |
| 6,795,642 | B2 * | 9/2004 | Matsumoto et al. | 386/295 |
| 2005/0018049 | A1 * | 1/2005 | Falk | 348/207.99 |
| 2009/0190653 | A1 * | 7/2009 | Seo et al. | 375/240.01 |
| 2010/0208064 | A1 * | 8/2010 | Liu et al. | 348/143 |

* cited by examiner

*Primary Examiner* — Sath V Perungavoor
*Assistant Examiner* — James Pontius
(74) *Attorney, Agent, or Firm* — Meunier Carlin & Curfman

(57) ABSTRACT

In an embodiment, a method of operating a video system comprises determining an aggregate video data rate based on a video data rate for each of a plurality of cameras, determining a projected retention capability based on the aggregate video data rate and available storage capacity, determining a level of risk that the projected retention capability will not satisfy a required retention capability, determining an adjustment to the video data rate for at least a target camera of the plurality of cameras based on the level of risk.

20 Claims, 5 Drawing Sheets

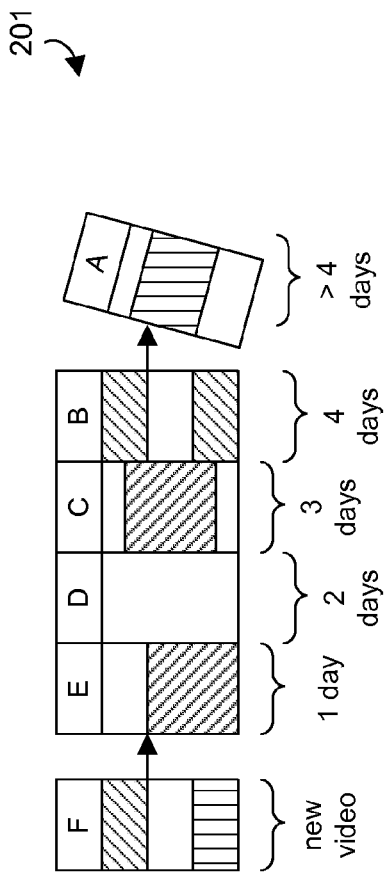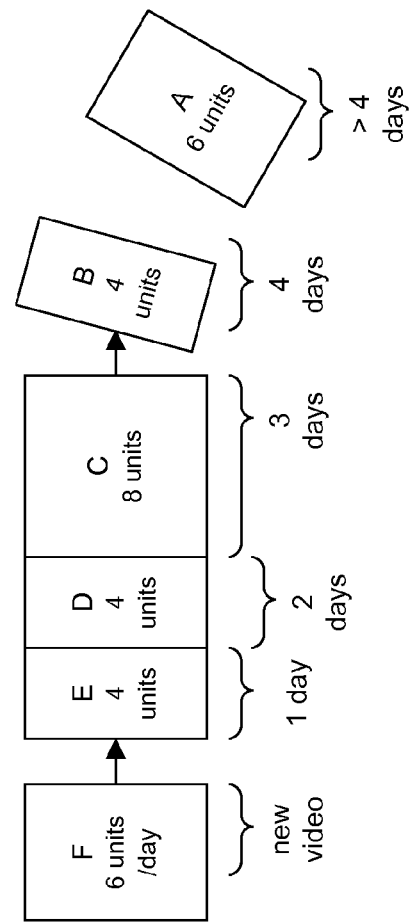
FIGURE 2A (PRIOR ART)
FIGURE 2B (PRIOR ART)

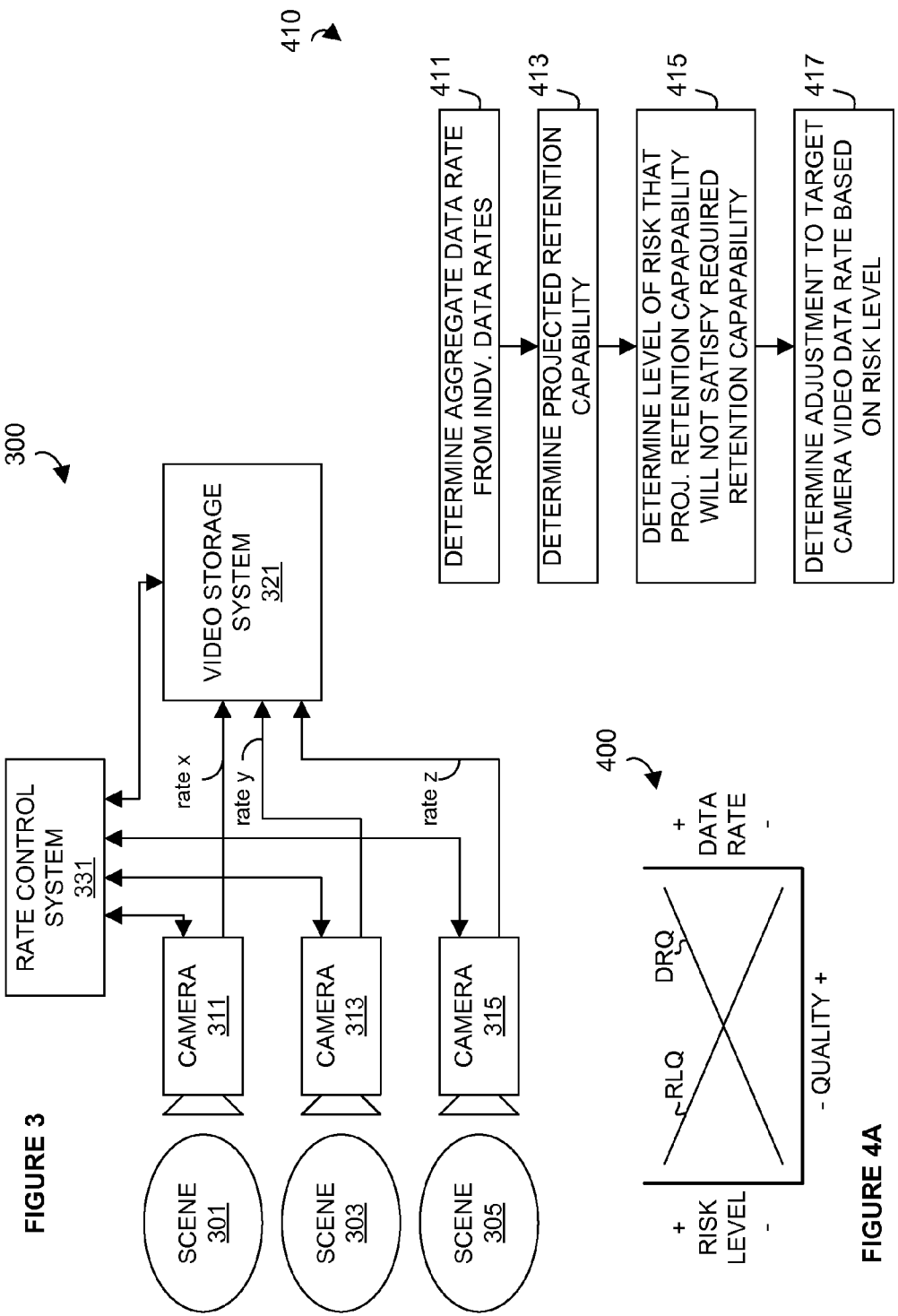

SYSTEMS AND METHODS FOR VIDEO RATE CONTROL

RELATED APPLICATIONS

This application is related to and claims priority to U.S. Provisional Patent Application No. 61/179,260, entitled VIDEO SYSTEM filed on May 18, 2009, and which is hereby incorporated by reference in its entirety.

TECHNICAL BACKGROUND

In the field of video surveillance, matching data storage capabilities to storage requirements has taken on increased importance with the introduction of high definition and network cameras, among other advances. Towards this end, many challenges arise when attempting to provide sufficient storage to meet demands in a cost effective manner. Namely, in the prior art a trade off always occurs between conserving storage space, and thus costs, and maintaining high quality video.

FIG. 1 illustrates one video surveillance environment 100 in an example of the prior art to explain the aforementioned tradeoff. In FIG. 1, cameras 111, 113, and 115, capture video of scenes 101, 103, and 105 respectively. In this example, each camera transmits the captured video to video storage system 121 at 1.33 units/day. As a result, video storage system 121 receives for storage about 4 units/day of video.

In this example, video storage system 121 has a storage capacity of 16 units. Further in this example, can be assumed for illustrative purposes that video must be retained for 4 days. Thus, at an aggregate rate of 4 units/day, video storage system 121 is capable of storing video for 4 days and any new video can be retained in accordance with requirements. As is shown in FIG. 1, video A contains 4 units of video and is greater than 4 days old. Video A is therefore discarded in some manner, such as by deletion or overwriting, to free up storage capacity for new video F, which is provided to video storage system 121 at a rate of 4 units/day. In the meantime, video B, C, D, and E remains stored in video storage system 121, although it can be understood that as video F arrives, some of video B will be discarded.

Referring now to FIGS. 2A and 2B, two examples 201 and 202 are provided to demonstrate the shortcomings of present video storage systems. Turning first to FIG. 2A, blocks of video A-F are shown with varying levels of quality in example 201. In typical video systems, compression must be varied from time to time in order to maintain a relatively constant data rate. In this example, to maintain a data rate of 1.33 units/day per camera, each camera adjusts compression based on its own individual data rate to generate video within blocks A, C, E, and F that has been compressed to varying degrees.

Unfortunately, the times when compression is increased due to increased activity in the camera view often correlate to periods when the recorded video is most valuable for surveillance purposes. As a result, the recorded, compressed video tends to include artifacts and other markers of low quality. Thus, while in FIG. 2A a video retention requirement may be met by each camera adjusting its own compression levels based on its own individual data rate, the quality of the stored video can be undesirable.

FIG. 2B illustrates a different approach whereby quality is emphasized over retention and bit rates are allowed to vary. In other words, during the times in example 201 when compression would be increased to reduce data rates, in example 202 compression is kept consistently low in order to maintain consistently high quality. This provides for high quality, stored video that is desirable for surveillance purposes. However, this also utilizes a greater amount of storage space. As a result, video is discarded from storage to make room for new video at a rate that does not satisfy retention requirements. For example, in FIG. 2A video block B is shown to have been prematurely discarded, even though it is only 4 days old.

Thus, a vexing tradeoff exists between providing high quality video and yet meeting retention requirements for that video. One solution is to simply add storage to levels exceeding the maximum possible data rate for any group of cameras. However, such a solution would be prohibitively expensive and wasteful. Rather, an elegant and useful solution is desired to achieve the storage of high quality video while meeting retention requirements.

OVERVIEW

Disclosed are systems, methods, and software that, as described herein, provide for the control of video data rates based on the risk that a projected retention capability will not satisfy a required retention capability. In this manner the quality of stored video will improve during the times when the video is of most interest for surveillance purposes, while still meeting retention requirements.

In an embodiment, a method of operating a video system comprises determining an aggregate video data rate based on a video data rate for each of a plurality of cameras, determining a projected retention capability based on the aggregate video data rate, determining a level of risk that the projected retention capability will not satisfy a required retention capability, determining an adjustment to the video data rate for at least a target camera of the plurality of cameras based on the level of risk.

In an embodiment, a rate control system comprises an interface and a processing system. The interface is configured to receive a video data rate for each of a plurality of cameras, and transfer an adjustment to the video data rate for at least a target camera of the plurality of cameras. The processing system is configured to determine an aggregate video data rate based on the video data rate for each of a plurality of cameras, determine a projected retention capability based on the aggregate video data rate, determine a level of risk that the projected retention capability will not satisfy a required retention capability, and determine the adjustment to the video data rate for at least a target camera of the plurality of cameras based on the level of risk.

In an embodiment, a priority is assigned to each of the plurality of cameras and selecting the target camera from the plurality of cameras based on the priority assigned to each of the plurality of cameras.

In an embodiment, the adjustment to the video data rate comprises an increase in the video data rate when the level of risk falls below a threshold level of risk.

In an embodiment, the adjustment to the video data rate comprises a decrease in the video data rate when the level of risk exceeds the threshold level of risk.

In an embodiment, the adjustment to the video data rate comprises reducing compression when the level of risk falls below a threshold level of risk, and increasing compression when the level of risk exceeds the threshold level of risk.

In an embodiment, the aggregate video data rate comprises a sum of the video data rate for each of the plurality of cameras.

In another embodiment, a rate control system comprises an interface and a processing system. The interface is configured to receive a video data rate for each of a plurality of cameras and transfer an adjustment to the video data rate for at least a target camera of the plurality of cameras. The processing system is configured to determine an aggregate video data rate based on the video data rate for each of a plurality of cameras, determine a projected retention capability based on the aggregate video data rate, and determine the adjustment to the video data rate for at least a target camera of the plurality of cameras based at least on the projected retention capability.

BRIEF DESCRIPTION OF THE DRAWINGS

FIGS. 2A and 2B illustrates examples of the prior art.
FIG. 3 illustrates a video system in an embodiment.
FIG. 4A illustrates a graph in an embodiment.
FIG. 4B illustrates a method of operating a rate control system in an embodiment, while

DETAILED DESCRIPTION

Figure 1:
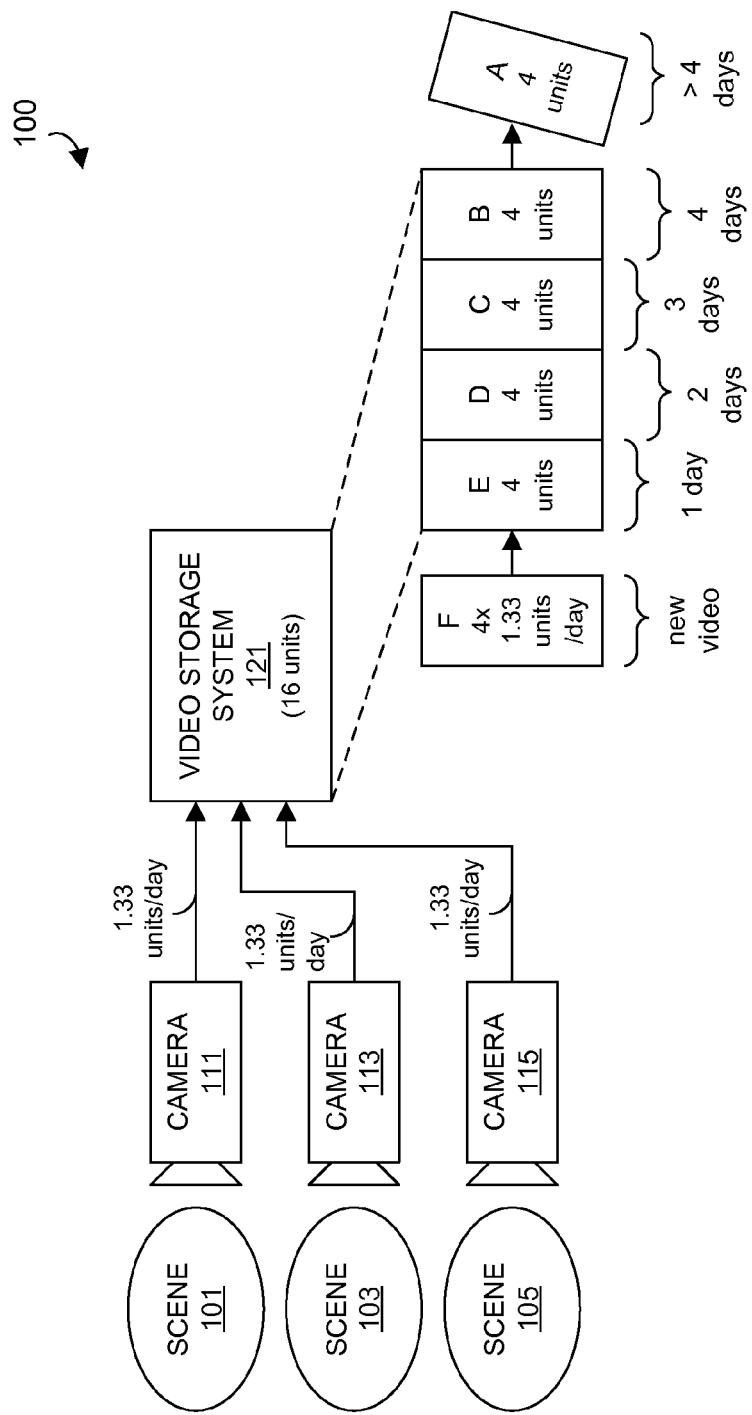
FIG. 1 illustrates an example of the prior art.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 3 illustrates video system 300. Video system 300 includes cameras 311, 313, and 315, video storage system 321, and rate control system 331. Cameras 311, 313, and 315 capture video of scenes 301, 303, and 305 respectively, and transfer the video for storage by video storage system 321. Rate control system 331 communicates with cameras 311, 313, and 315, as well as video storage system 321, to control the rate at which video is generated and transferred to storage.

As shown, camera 311 transfers video at rate x, camera 313 transfers video at rate y, and camera 315 transfers video at rate z. The rate at which video is transferred may be in terms of volume per unit of time, such as bits per second, bits per day, or any other variation thereof, including greater or lesser measurements of data, or greater or lesser measurements of time.

In operation, rate control system 310 functions to regulate the rate at which cameras 311, 313, and 315 generate and transfer video data for storage by video storage system 321. In particular, rate control system 310 governs the aggregate data rate produced by all of the cameras according to a relationship between quality, risk levels, and data rates shown by graph 400, in FIG. 4A. The aggregate data rate is a sum of the data rates from cameras 311, 313, and 315. Therefore, rate control system 310 determines the aggregate data rate that was produced by cameras 311, 313, and 315 at various times in the past in order to predict a data rate for each camera at a current or future time that is in accordance with a desired aggregate data rate at the current or future time. For example, determining the aggregate data rate for cameras 311, 313, and 315 for the noon hour on the previous Tuesday may allow for rate control system 310 to predict and set an aggregate data rate for cameras 311, 313, and 315 during the noon hour on the following Tuesday. A desired aggregate rate may be achieved by independently adjusting the video quality parameters, such as frame rate, resolution, and compression parameters, of each of cameras 311, 313, and 315.

Referring to FIG. 4A, graph 400 includes two graphs: 1) risk level graphed against quality—or RLQ, and 2) data rate against quality, or DRQ. Risk is the likelihood that the aggregate data rate produced by cameras 311, 313, and 315 will result in a failure to meet a storage retention requirement. Quality refers to the general quality level of the video produced by cameras 311, 313, and 315. As discussed above, the data rate is the rate at which video cameras 311, 313, and 315 capture and transfer video data for storage.

As shown by the graph of RLQ, as risk declines, quality can be allowed to increase. But as is also shown by the graph of DRQ, as quality is allowed to increase, data rates will also increase. Rate control system 310 operates based on the principal that, by first determining the risk of failing a retention requirement, the proper quality level can be determined, and from that determination data rates can be set. In some systems there are minimum retention requirements that must be met, may have a minimum allowable video quality level, among other possible constraints. Therefore, risk may also take into account definitive constraints, such as retention and video quality requirements. Rate control system 310 may balance the constraints when determining a future aggregate data rate. Additionally, as a result of complying with these various constraints, future aggregate data rates may only be predicted to be in a particular range rather than an exact value.

In other words, rate control system 310 continuously monitors the aggregate data rate produced by cameras 311, 313, and 315 to project the retention capability of video storage system 321 based, at least in part, on the aggregate data rate. Other factors may be considered when generating the retention capability projection. Rate control system 321, using the projection, can then assess the risk that video retention system 321 will violate a retention requirement. Based on this risk assessment, video control system 310 selects at least one of the cameras as a target camera and adjusts its video data rate accordingly.

FIG. 4 illustrates a method 410 of operating rate control system 310 in accordance with the aspects described above for graph 400. To begin, rate control system 310 determines an aggregate data rate from the individual data rates of various cameras (step 411). The aggregate data rate could be, for example the sum of rates, x, y, and z, obtained by rate control system 331 via communication with cameras 111, 113, and 115. Alternatively, rate control system 331 could obtain the aggregate data rate by communication with and/or monitoring of video storage system 321. Other mechanisms are possible.

Next, rate control system 310 determines a projected retention capability based on the aggregate data rate (step 413). The projected retention capability is an estimate of how long video storage system 321 will retain new and future video data incoming at the aggregate data rate. For instance, the projected retention capability may indicate that video will be retained for a duration of hours, days, weeks, or otherwise. This can be based on a number of other factors, in addition to the aggregate data rate.

Upon determining the projected retention capability in view of the aggregate data rate, rate control system 310 determines a level of risk that the projected retention capability will not satisfy a required retention capability (415). For instance, the aggregate data rate may be subject to predictable future changes, such as an increase of a decrease in the rate.

These potential changes are factors in the risk that the retention requirement will or will not be satisfied.

Lastly, rate control system 310 determines an adjustment to a video data rate produced by target camera—at least one of cameras 311, 313, and 315—based on the determined level of risk. In an example, the video data rate may be increased, decreased, or held unchanged. This is accomplished by, for example, transferring a message to the target camera with instructions to adjust its video data rate accordingly. Such an adjustment can occur by way of, for example, altering a compression scheme.

Figure 5:
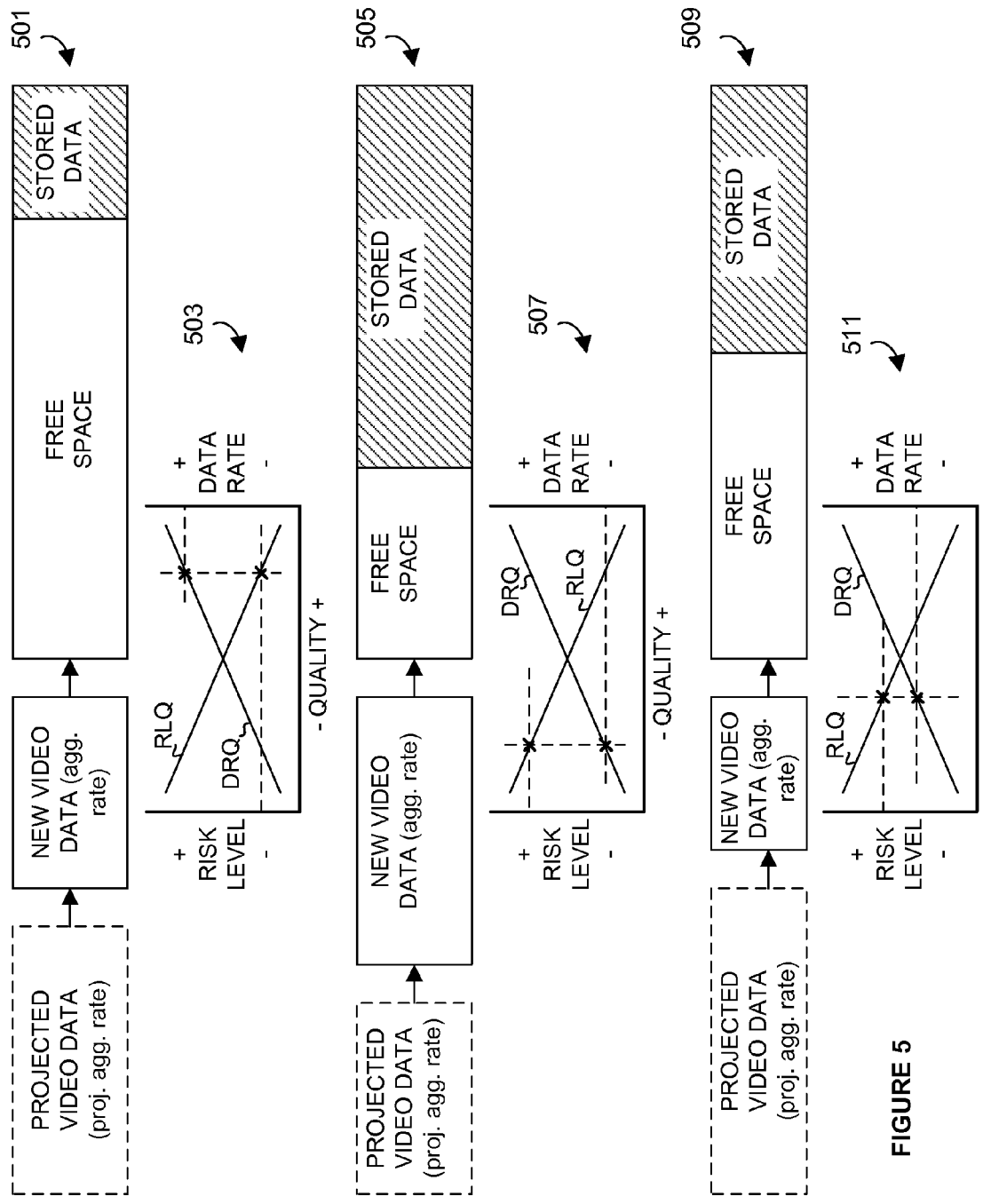
FIG. 5 illustrates the operation of a video system via a sequence of stages in an embodiment.

Turning now to FIG. 5, several stages 501, 505, and 509 are provided in sequence to illustrate the principals described by graph 400. Graphs 503, 507, and 511 are provided to further illustrate those principals.

Beginning with stage 501, a video storage contains a large amount of free space relative to stored data. New video data is generated by video cameras at an aggregate data rate for storage in the storage system. A retention requirement that the new video data must be stored for a certain amount of time is assumed, and thus a determination must be made whether or not to increase or decrease the quality of the video to be stored in the storage system, or leave the quality unchanged.

To make this determination, a projection of how much video will be produced in the future is determined. This information, along with the present aggregate data rate, is used to assess the retention capability of the storage system. The retention capability of the storage system is then processed to determine the risk that the capability of the storage system will fail to meet the retention requirement.

Graph 503 is illustrated to show that, with a relatively large ratio of free space to stored data, the risk that the projected retention capability will not satisfy the retention requirement is reduced. The free space may exist due to new storage being installed in the storage system, the storage system may maintain reserve free space to mitigate risk, the free space may be space that includes stored video that has already met the retention requirements of the stored video and is free to be overwritten, or any other reason that the storage system may contain free space. Thus, with a low risk, the corresponding quality of the video captured by the cameras can be high. A high level of quality corresponds to a high data rate. Accordingly, at least a target camera can be configured to increase is video data rate, thereby increasing its video quality and improving the quality of the stored video.

Moving on to stage 505, the aggregate data rate of new video has increased relative to stage 501. Likewise, since the aggregate data rate has increased, less free space is now available in the storage system, and the volume of stored data has increased. However, the projected video data rate has decreased relative to stage 501.

Accordingly, graph 507 shows the balance of these various factors. Due to the reduced amount of free space and the increased aggregate data rate for new video, the risk that the retention requirement will be violated has increased substantially relative to stage 501.

With this in mind, the overall quality of video must be reduced, so as to reduce the data rate of incoming video data. This reduction will lower the risk that the retention requirement will be violated. In order to reduce the aggregate data rate, the data rate associated with at least one camera is reduced, which in turn reduces the aggregate data rate.

Moving on again to stage 509, with the aggregate data rate having been reduced in stage 505, the amount of free space available on the storage system has increased relative to the stored data. In this example stage 509, the amount of projected video data has increased relative to that in stage 507.

With these factors all considered, the projected storage capability of the storage system is assessed yet again to determine the risk that the retention requirement will be violated.

Graph 511 shows the balance of the factors. In particular, graph 511 shows that the reduction of the aggregate data rate and the increase in available storage space as reduced the risk that the retention requirement will be violated. It should be noted that, even with the relative increase in projected video data, the risk may still yet be reduced. In view of the reduced risk, video quality can be increased, which is accomplished by increasing the video data rate of at least one camera.

Figure 6:
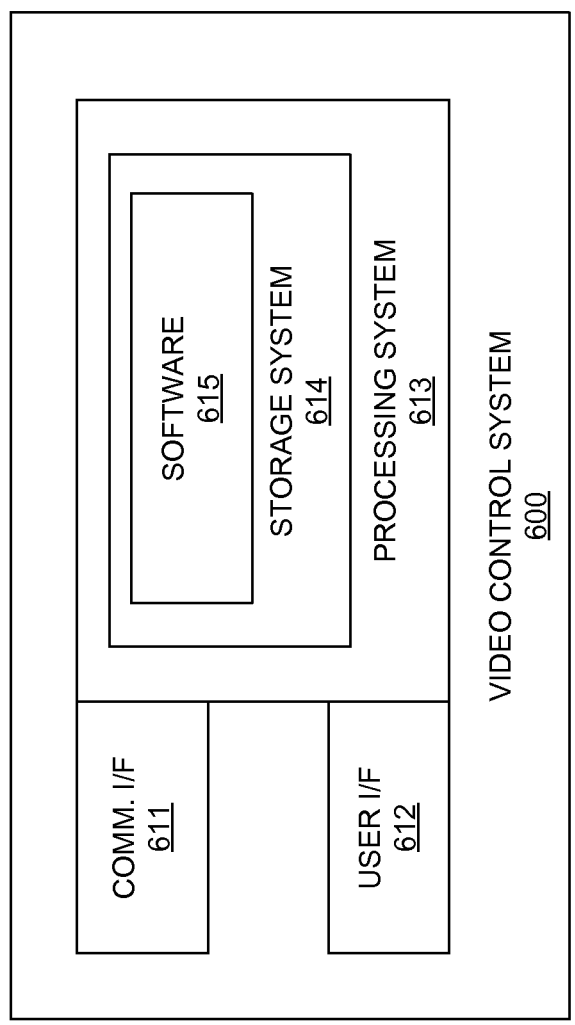
FIG. 6 illustrates a rate control system in an embodiment.

FIG. 6 illustrates rate control system 600 in another embodiment. Rate control system 600 may be representative of rate control system 331, but other rate control systems are possible. Rate control system 600 includes communication interface 611, user interface 612, processing system 613, storage system 614, and software 615. Processing system 613 is linked to communication interface 611 and 612. Software 615 is stored on storage system 614. In operation, processing system 613 executes software 615 to operate as disclosed herein for a rate control system.

Communication interface 611 comprises a network card, network interface, port, or interface circuitry that allows rate control system 600 to receive video data rates and transfer adjustments. Communication interface 611 may also include a memory device, software, processing circuitry, or some other communication device. Communication interface 611 may use various well known protocols.

User interface 612 comprises components that interact with a user to receive user inputs and to present media and/or information. User interface 612 may include a speaker, microphone, buttons, lights, display screen, mouse, keyboard, or some other user input/output apparatus—including combinations thereof. User interface 612 may be omitted in some examples.

Processing system 613 may comprise a microprocessor and other circuitry that retrieves and executes software 615 from storage system 614. Storage system 614 comprises a disk drive, flash drive, data storage circuitry, or some other memory apparatus. Processing system 613 is typically mounted on a circuit board that may also hold storage system 614 and portions of communication interface 611 and user interface 314.

Software 615 comprises computer programs, firmware, or some other form of machine-readable processing instructions. Software 615 may include an operating system, utilities, drivers, network interfaces, applications, virtual machines, or some other type of software. When executed by processing system 613, software 615 directs processing system 613 to operate rate control system 600 as described herein for a rate control system.

The following discusses in more detail the operation of a rate control system, such as rate control system 331 described herein, and its advantages relative to the prior art. Such intelligent operation performs rate control to achieve a video retention target.

In the prior art, video rate controls implemented in an encoder only takes one camera into account. In addition, the encoder normally only calculates the average data rate over the last few seconds when implementing video rate controls.

Problematically, if the rate control mechanism of an encoder is the only tool available for attempting to maintain a specific average data rate, the encoder will tend to increase compression and thus reduce video quality during periods when activity is highest and decrease compression and thus increase video quality during periods when activity is lowest. This encoder behavior may be exactly the opposite of what would intuitively be desired of the system. In the prior art, the system will use more storage for higher quality video images during periods when nothing of interest is happening, and the system will produce the lowest video quality during periods when activity is highest and it is more likely that something of interest may occur.

In contrast, to optimize video quality while achieving a video retention target, the proposed system needs to take into account the aggregate data rate for all cameras across much longer time periods. For example, at some locations, such as a store or other such enterprise, it is known that most cameras produce a much lower data rate at night and a higher data rate during the day. If the fact that lower data rates at night will help to offset the higher data rates during the day is taken into account, then the data rates can be allowed to go higher during the day and still achieve the target aggregate rate.

For example, it is also known that, for retail stores, activity levels and therefore video data rates tend to rise during the weekend and fall in the middle of the week. If the fact that lower data rates during the middle of the week will help to offset the higher data rates on the weekend is taken into account, then the data rates can be allowed to go higher over the weekend and still achieve the target aggregate data rate over a 30 or 60 day video retention period.

Finally, each server in such an exemplary environment may record video for up to 120 cameras, and camera views and therefore video data rates can vary widely from camera to camera. If the low data rates produced by some cameras are taken into account, then data rates can be allowed to go higher on other cameras and still achieve the target aggregate data rate across all cameras.

It would be advantageous for a rate control system to automatically tune the video compression to produce the maximum video quality that would still allow the video retention requirement to be achieved. The rate control system could monitor the average video data rate across all cameras for a server and across entire 24 hour periods and seven day periods. The rate control system would then calculate the projected storage requirements for future days based on recent average data rates for each camera for each time of day and day of the week.

If projections indicate there is a risk that video retention could fall below the requirement within the next 30 days, then the rate control system would adjust the video compression configuration to reduce the data rate sufficiently to bring the projections back in line with the required retention plus a margin of safety.

If projections indicate that video retention will exceed the requirement plus a safety margin, then the rate control system would adjust the video compression configuration to increase the video quality. This would allow the data rate to increase to bring the projections back in line with the required retention.

With this intelligent rate control feature, the rate control system would make decisions about video compression adjustments instead of allowing the encoder to make those decisions. The encoder would be constrained to a narrow range of quantization scale factors or perhaps a single fixed value (meaning constant video quality). The rate control system would send a new quantization scale factor to the encoder when needed to adjust the video compression instead of allowing the encoder to adjust the scale factor. The rate control system could adjust the quantization more intelligently because the system would have relevant information not available to the encoder.

In an extension, cameras could be categorized, setting different allowable quality ranges for each camera category, and prioritizing the categories. Time of day would need to be taken into account when defining the camera priorities. For example, pharmacy cameras for a pharmacy located within a larger retail store would have higher priority during the hours when the pharmacy is open. Loading dock cameras would have higher priority during the hours when most deliveries arrive.

When the rate control system needs to decrease data rates, the software could adjust the video quality for the lowest priority cameras, taking time-of-day into account. When the lowest priority category is using the lowest allowed quality setting for that category during the lowest priority hours, then the rate control system would begin to adjust the quality for the next higher priority. This process would continue in priority sequence from lowest to highest until all cameras have been adjusted to the lowest allowed video quality.

Instead of moving all the way to the lowest quality before continuing to the next camera priority, quality adjustments could go through a series of steps, for example high, medium, and low quality. Starting with all cameras at high quality, to reduce the data rates the rate control system would first adjust the quality from high to medium, starting with the lowest priority cameras. If that first adjustment was not sufficient, then the next higher priority camera category would move to medium quality. This would continue until all cameras have moved to medium quality. If the adjustment is still not sufficient, the lowest priority cameras would move to the lowest quality.

Adjusting to higher quality or higher data rates would work in the reverse sequence, improving the quality of the highest priority cameras during the highest priority hours first and working towards progressively lower priority cameras.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a video system, the method comprising:
   determining an aggregate video data rate based on a video data rate for each of a plurality of cameras;
   determining a projected retention capability based on the aggregate video data rate;
   determining a level of risk that the projected retention capability will not satisfy a required retention capability;
   determining an adjustment to the video data rate for at least a target camera of the plurality of cameras based on the level of risk.

2. The method of claim 1 further comprising assigning a priority to each of the plurality of cameras and selecting the target camera from the plurality of cameras based on the priority assigned to each of the plurality of cameras.

3. The method of claim 1 wherein the adjustment to the video data rate comprises an increase in the video data rate when the level of risk falls below a threshold level of risk.

4. The method of claim 3 wherein the adjustment to the video data rate comprises a decrease in the video data rate when the level of risk exceeds the threshold level of risk.

5. The method of claim 1 wherein the adjustment to the video data rate comprises reducing compression when the level of risk falls below a threshold level of risk, and increasing compression when the level of risk exceeds the threshold level of risk.

6. The method of claim 1 wherein the aggregate video data rate comprises a sum of the video data rates for each of the plurality of cameras.

7. A rate control system comprising:
an interface configured to:
receive a video data rate for each of a plurality of cameras; and
transfer an adjustment to the video data rate for at least a target camera of the plurality of cameras; and
a processing system configured to:
determine an aggregate video data rate based on the video data rate for each of a plurality of cameras;
determine a projected retention capability based on the aggregate video data rate and available storage capacity;
determine a level of risk that the projected retention capability will not satisfy a required retention capability; and
determine the adjustment to the video data rate for at least a target camera of the plurality of cameras based on the level of risk.

8. The rate control system of claim 7 wherein the processing system is further configured to assign a priority to each of the plurality of cameras and select the target camera from the plurality of cameras based on the priority assigned to each of the plurality of cameras.

9. The rate control system of claim 7 wherein the adjustment to the video data rate comprises an increase in the video data rate when the level of risk falls below a threshold level of risk.

10. The rate control system of claim 9 wherein the adjustment to the video data rate comprises a decrease in the video data rate when the level of risk exceeds the threshold level of risk.

11. The rate control system of claim 7 wherein the adjustment to the video data rate comprises reducing compression when the level of risk falls below a threshold level of risk, and increasing compression when the level of risk exceeds the threshold level of risk.

12. The rate control system of claim 7 wherein the aggregate video data rate comprises a sum of the video data rates for each of the plurality of cameras.

13. A rate control system comprising:
an interface configured to:
receive a video data rate for each of a plurality of cameras; and
transfer an adjustment to the video data rate for at least a target camera of the plurality of cameras; and
a processing system configured to:
determine an aggregate video data rate based on the video data rate for each of a plurality of cameras;
determine a projected retention capability based on the aggregate video data rate and the available storage capacity;
determine the adjustment to the video data rate for at least a target camera of the plurality of cameras based at least on the projected retention capability.

14. The rate control system of claim 13 wherein the processing system is further configured to assign a priority to each of the plurality of cameras and select the target camera from the plurality of cameras based on the priority assigned to each of the plurality of cameras.

15. The rate control system of claim 13 wherein the processing system is further configured to determine a level of risk that the projected retention capability will not satisfy a required retention capability.

16. The rate control system of claim 15 wherein the processing system is configured to determine the adjustment to the video data rate based on the level of risk.

17. The rate control system of claim 16 wherein the adjustment to the video data rate comprises an increase in the video data rate when the level of risk falls below a threshold level of risk.

18. The rate control system of claim 17 wherein the adjustment to the video data rate comprises a decrease in the video data rate when the level of risk exceeds the threshold level of risk.

19. The rate control system of claim 16 wherein the adjustment to the video data rate comprises reducing compression when the level of risk falls below a threshold level of risk, and increasing compression when the level of risk exceeds the threshold level of risk.

20. The rate control system of claim 13 wherein the aggregate video data rate comprises a sum of the video data rate for each of the plurality of cameras.

\* \* \* \* \*